US008215884B2

(12) United States Patent
Bulow

(10) Patent No.: US 8,215,884 B2
(45) Date of Patent: Jul. 10, 2012

(54) CONNECTOR FOR USE IN HIGH VIBRATION ENVIRONMENT

(75) Inventor: Jeffrey A. Bulow, Syracuse, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 211 days.

(21) Appl. No.: 12/336,251

(22) Filed: Dec. 16, 2008

(65) Prior Publication Data

US 2010/0151717 A1 Jun. 17, 2010

(51) Int. Cl.
*F16B 39/10* (2006.01)

(52) U.S. Cl. .......................... 411/121; 411/116; 439/321

(58) Field of Classification Search ......................... None
See application file for complete search history.

(56) References Cited

U.S. PATENT DOCUMENTS

| | | | | |
|---|---|---|---|---|
| 1,043,298 | A * | 11/1912 | Clark | 220/236 |
| 3,462,727 | A * | 8/1969 | Damoisiaux et al. | 439/321 |
| 4,046,481 | A * | 9/1977 | Horvath | 403/320 |
| 4,097,105 | A | 6/1978 | Zumwalt | |
| 4,441,775 | A * | 4/1984 | Walters | 439/312 |
| 4,655,482 | A * | 4/1987 | Myers et al. | 285/81 |
| 4,703,988 | A | 11/1987 | Raux et al. | |
| 4,746,303 | A | 5/1988 | Cobraiville et al. | |
| 4,808,123 | A * | 2/1989 | Dee et al. | 439/470 |
| 5,344,328 | A * | 9/1994 | Suggs | 439/127 |
| 6,419,519 | B1 * | 7/2002 | Young | 439/446 |
| 7,189,097 | B2 | 3/2007 | Benham | |
| 7,316,533 | B2 * | 1/2008 | Tanimura | 411/119 |
| 7,354,294 | B2 | 4/2008 | Kawate et al. | |
| 7,371,113 | B2 | 5/2008 | Burris et al. | |
| 7,438,579 | B1 | 10/2008 | Pellen | |
| 7,527,464 | B2 * | 5/2009 | Stewart et al. | 411/107 |
| 7,607,878 | B2 * | 10/2009 | Whipple et al. | 411/221 |
| 2007/0155231 | A1 | 7/2007 | Tang | |
| 2007/0155233 | A1 | 7/2007 | Laerke et al. | |

OTHER PUBLICATIONS

International Search Report dated Feb. 4, 2010 for related application PCT/US2009/068054.

* cited by examiner

*Primary Examiner* — Gary Estremsky
(74) *Attorney, Agent, or Firm* — Howard IP Law Group, PC

(57) ABSTRACT

A locking mechanism inhibits rotational movement of a nut of a first cable connector that is threadingly engaged with a mating second cable connector. The nut has at least one recess in its outer surface along an edge and is rotatably mounted on a fixed housing of the first cable connector. The mechanism includes a component adapted to removably surround at least a portion of the housing and includes at least one first element matingly engageable with a corresponding second element positioned on the housing. A projection is rigidly mounted on the component. The projection is adapted to engage the at least one recess of the nut when the component is engaged with the outer surface of the housing.

17 Claims, 6 Drawing Sheets

CONNECTOR FOR USE IN HIGH VIBRATION ENVIRONMENT

FIELD OF THE INVENTION

The present invention relates generally to cable connectors for use in high vibration environment.

BACKGROUND OF THE INVENTION

Cables have been connected using known electrical connectors. Some of these connections involve threaded connections wherein the female connector has external threads and the male connector has corresponding internal threads. Radio Frequency (RF) connectors, which maintain the shielding, are used with coaxial cables while minimizing the change in the transmission line impedance at the connection. Some RF connectors mechanically fasten with one another only via threads, for example. In a high vibration environment, such connectors may back off, resulting in compromised connections. Means such as liquid sealants for maintaining connections are known in the art. However such means are not reliable and potentially hazardous. Applying such means also involve manual labor. Alternative mechanisms are desired.

SUMMARY OF THE INVENTION

An embodiment of the invention includes a locking mechanism to inhibit rotational movement of a nut of a first cable connector that is threadingly engaged with a mating second cable connector. The nut has at least one recess in its outer surface along an edge and is rotatably mounted on a fixed housing of the first cable connector. The mechanism includes a component adapted to removably surround at least a portion of the housing. The component includes at least one first element matingly engageable with a corresponding second element positioned on the housing. The mechanism further includes a projection rigidly mounted on the component. The projection is adapted to engage the at least one recess on the nut when the component is engaged with the outer surface of the housing.

Yet another embodiment of the invention includes a kit for providing a locking mechanism to inhibit rotational movement of a nut of a first cable connector that is threadingly engaged with a mating second cable connector. The nut has at least one recess on its outer surface and is rotatably mounted on a fixed housing of the first connector. The kit includes a tension strap having at least one first element. The tension strap is dimensioned to circumscribe the housing. The kit also includes a spring clip having at least one projection projecting longitudinally and at least one second element adapted to matingly engage with the at least one first element. The projection is adapted to matingly engage the at least one recess.

According to an aspect of the present invention, there is disclosed a method for inhibiting rotational movement of a nut of a first cable connector that is threadingly engaged with a mating second cable connector. The nut has at least one recess in its outer surface along an edge, and is rotatably mounted on a fixed housing of the first cable connector. The method includes a step of removably securing a component to at least a portion of the housing. The component includes at least one first element matingly engageable with at least one corresponding second element positioned on the housing. The method further includes a step of matingly engaging the component with the at least one recess on the nut via a projection rigidly mounted on the component, thereby securing the nut to the component and the housing.

BRIEF DESCRIPTION OF THE FIGURES

Understanding of the present invention will be facilitated by consideration of the following detailed description of the exemplary embodiments of the present invention taken in conjunction with the accompanying drawings, in which like numerals refer to like parts and in which.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, many other elements found in typical electrical connectors. However, because such elements are well known in the art, and because they do not facilitate a better understanding of the present invention, a discussion of such elements is not provided herein. The disclosure herein is directed to all such variations and modifications known to those skilled in the art.

Figure 1:
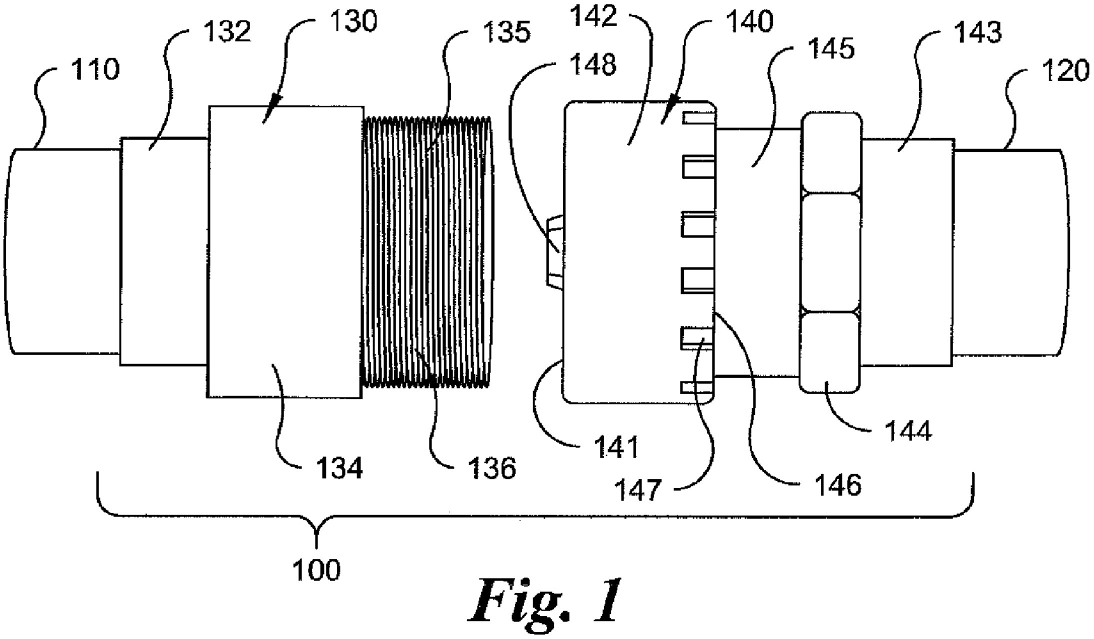
Fig. 1 (Prior Art)
FIG. 1 illustrates a prior art connector assembly between two coaxial cables.

FIG. 1 depicts a prior art electrical connector assembly 100 for coupling together coaxial cables 110, 120. Connector assembly 100 includes a female connector 130 and a male connector 140. Female connector 130 includes a first hollow body 132, a housing 134, and a connecting ring 135. First hollow body 132 is adapted to receive cable 110. Connecting ring 135 has external threads 136 formed on the outer surface of ring 135. An end of cable 110 is inserted through hollow body 132 whereupon female connector 130 is affixed to cable 110. Male connector 140 includes a second hollow body 143, a nut 144, a housing 145, a crown nut 142, and a connector structure 148 containing one or more electrical connections. Second hollow body 143 is adapted to receive cable 120. Connector structure 148 is adapted to engage a socket assembly (not shown) positioned within female connector 130. Connector structure 148 contains one or more electrical connections (not shown) therein, which connection(s) is adapted to be received in a corresponding socket (not shown) within female connector 130 so as to establish an electrical connection between two coaxial cables 110, 120, as is well known by those of ordinary skill in the art. Crown nut 142 has internal threads (not shown) defined on the interior surface of nut 142, adjacent to edge 141 facing connecting ring 135. The internal threads (not shown) of crown nut 142 are adapted to engage exterior threads 136 when crown nut 142 is rotated in a given direction, thereby driving nut 142 onto connecting ring 135, thereby establishing a mechanical connection between cable connectors 130, 140 to maintain the aforementioned electrical connection established between cables 110, 120. An end of cable 120 is inserted through second hollow body 143 whereupon male connector 140 is affixed to cable 120. Nut 144 is used to maintain a tight grip of second hollow body 143 over cable 120. Crown nut 142 further includes a plurality of recesses 147 which assist in gripping nut 142 while tightening or loosening the connection between connectors 130, 140. Recesses 147 are defined on the outer surface of crown nut 142, along a circumferential edge 146 adjacent to housing 145. Recesses 147 extend longitudinally, at least partially, along crown nut 142. Male connector 140 also includes a housing 145 having an outer diameter smaller than the inner diameter of crown nut 142. Housing 145 has a smooth outer surface.

Figure 2A:
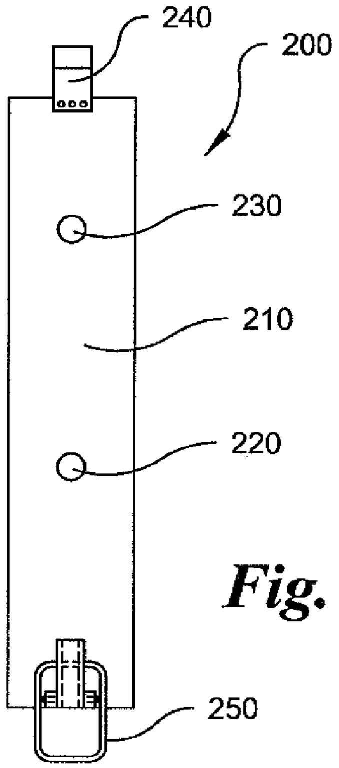
FIGS. 2A-2B illustrate an exemplary tension clasp according to an embodiment of the invention.
Figure 2B:
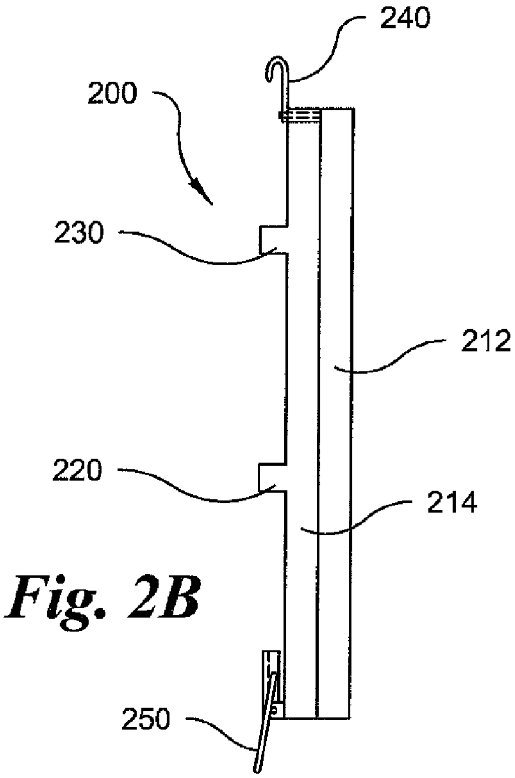

FIG. 2A shows a front view of an exemplary tension strap 200, while FIG. 2B shows a corresponding side view. In an exemplary embodiment, strap 200 includes an elongated planar member 210 formed of two layers 212, 214. In an exemplary embodiment, two projections or bosses 220, 230 extend from layer 214. In other embodiments, strap 200 may include indents instead of projections or bosses 220, 230. A hook 240 and buckle 250 are attached to opposite ends of elongated member 210 and adapted to connect to one another about housing 145. The dimensions of strap 200 are dependent on the dimensions of housing 145 (of FIG. 1). The length of elongated member 210 is slightly less than the circumference of housing 145 (of FIG. 1), thus ensuring a tight fit upon housing 145. Elongated member 210 may be fabricated from a light metal, such as aluminum, of sufficient rigidity to provide strength to mount and retain bosses 220, 230, but also sufficiently flexible to bend open to accommodate connector assembly 100 and sufficiently resilient to return to its original shape and be formed to housing 145. In an exemplary embodiment, layer 212 may be implemented as a rubber backing for gripping the smooth outer surface of housing 145.

Strap 200 is adapted to be mounted on housing 145 (of FIG. 1). Planar elongated planar member 210 circumscribes housing 145. Hook 240 at a first end of member 210 is inserted into and engages buckle 250 at a second end of member 210. The insertion of hook 240 into buckle 250 may require a slight stretch in planar member 210. The cooperation of hook 240 and buckle 250 induces tensile forces in planar member 210 because the length of planar member 210 is slightly less than the circumference around the outer diameter of housing 145. Such tensile forces in member 210 causes strap 200 to compress layer 212 of planar member 210 and to tightly grip housing 145 (of FIG. 1) thereby inhibiting a relative motion between strap 200 and housing 145 (of FIG. 1). Layer 212, made of a rubber backing, in one configuration, frictionally engages the outer surface of housing 145 (of FIG. 1) as an additional measure to inhibit relative motion between strap 200 and outer surface of housing 145 (of FIG. 1). In an exemplary embodiment, rubber backing may be similar in thickness and texture to those of an inner tube for a bicycle tire.

Figure 3A:
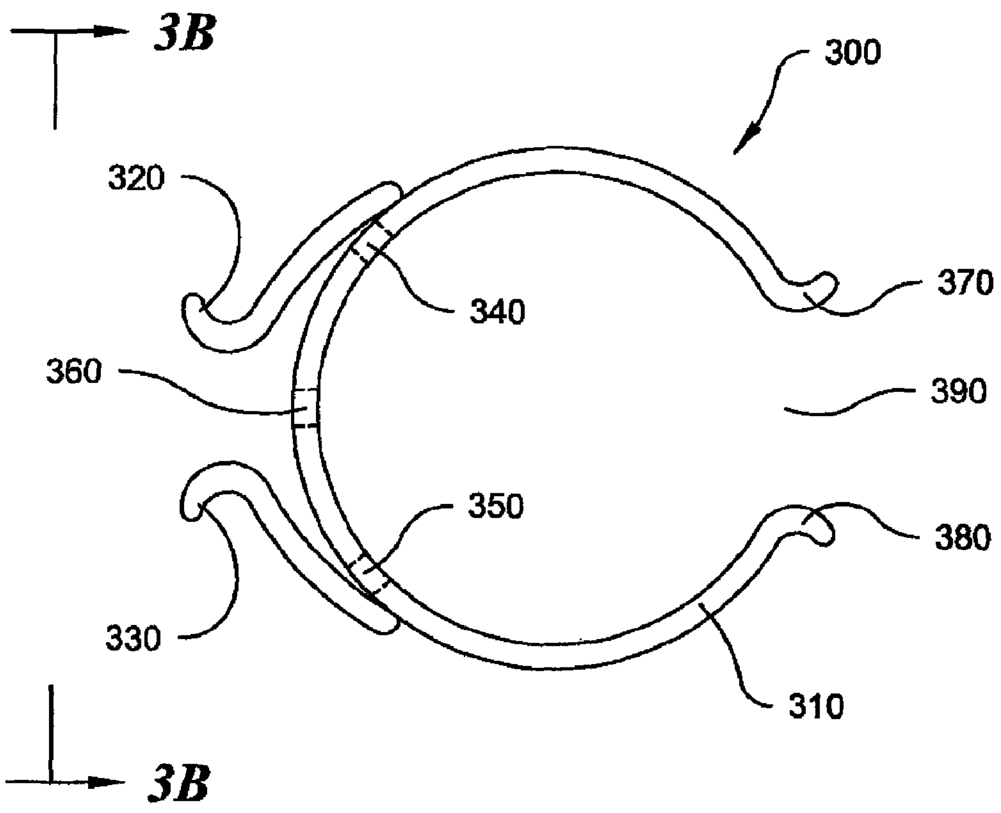
FIGS. 3A-3C show an exemplary spring clip according to an embodiment of the invention.
Figure 3B:
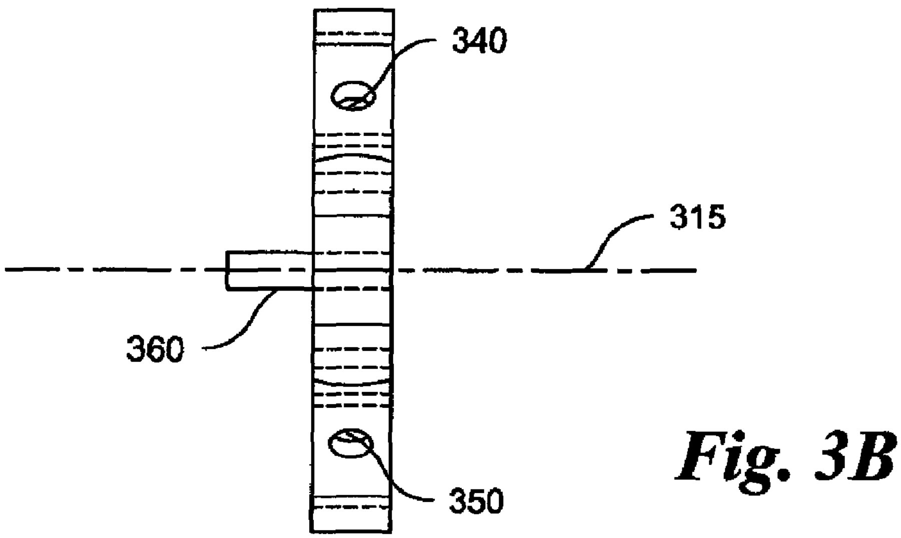
Figure 3C:
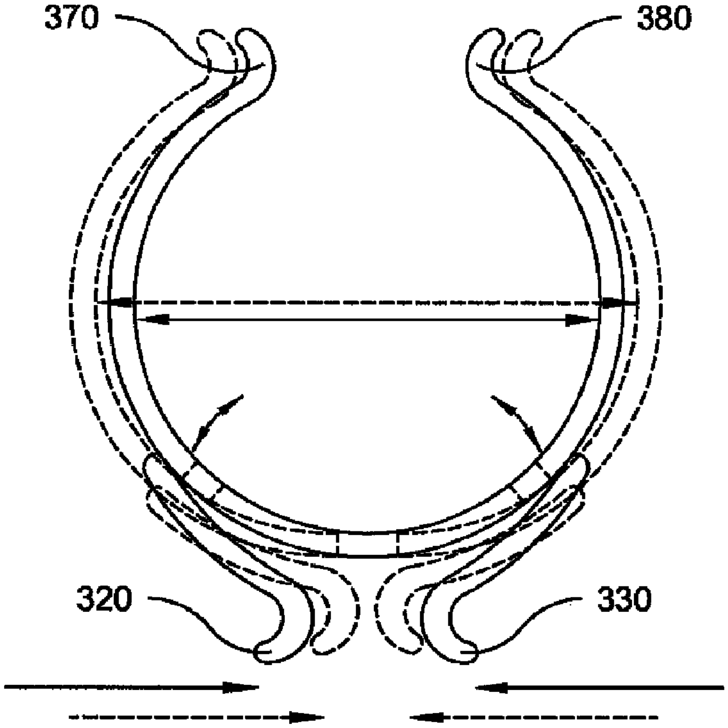

Referring now to FIGS. 3A and 3B, a component in the form of a spring clip 300 is illustrated. Component 300 is adapted to removably surround at least a portion of housing 145. FIG. 3A illustrates a side-view of a spring clip 300 adapted to engage the RF connector assembly 100 for providing a more secure connection, whereas FIG. 3B illustrates a front view of spring clip 300. In an exemplary configuration, as seen in FIGS. 3A-3B, spring clip 300 includes a generally curved member 310. Member 310 defines a generally circular shape. Member 310 has two ends 370, 380 defining an opening 390. In an exemplary embodiment, member 310 has two indents 340, 350. Indents 340, 350 may also be through apertures. Indents 340, 350 are adapted to accommodate projections or bosses 220, 230 (of FIGS. 2A-2B) respectively. The number of indents in member 310 may vary depending on the number of projections or bosses on strap 200 so long as there is a one-to-one correspondence between at least one of indents 340, 350 and at least one of projections or bosses 220, 230. Preferably, there exists a one to one correspondence between all indents 340, 350 and bosses 220, 230. In other embodiments, when strap includes indents, clip 300 may include projections or bosses instead of indents 340, 350. One skilled in the art will appreciate the various combinations that are possible wherein strap 200 may have one projection and one indent, while clip 300 may have corresponding indent and projection. These and other such variations are contemplated to be within the scope of the present invention. Clip 300 has two pinch tabs 320, 330. Tabs 320, 330 are located generally symmetrically about the mid-point of member 310, in an exemplary embodiment. As illustrated in FIG. 3C, pressing tabs 320, 330 towards each other causes ends 370, 380 to move away from each other thereby increasing the width of opening 390. To mount clip 300 on housing 445 and/or strap 200, tabs 320, 330 are pressed towards each other to increase the width of opening 390 sufficient to surround at least a portion of housing 445 and/or strap 200. Clip 300 is then mounted on housing 445 and/or strap 200 by aligning indents 340, 350 with projections or bosses 220, 230. Tabs 320, 330 are then released to secure clip 300 to housing 445 and/or strap 200. Clip 300 may be unmounted by again pressing tabs 320, 330 to increase the width of opening 390 and removing clip 300 away from housing 445 and/or strap 200. Thus, clip 300 is adapted to removably surround at least a portion of housing 445.

Clip 300 further includes a projection 360. Projection 360 projects generally longitudinally, and in an exemplary embodiment, orthogonally from member 310 in a direction parallel to the central axis 315 of member 310. In an embodiment, projection 360 has a width generally equal to the width of recess 147 (of FIGS. 1, 4) and is adapted to engage at least one of recesses 147 (of FIG. 1) or recesses 447 (of crown nut 142 of FIG. 4). In another embodiment, projection 360 may have two or more prongs, each adapted to engage one of recesses 147. Projection 360 is sufficiently rigid so as to resist shear forces resulting from environmental vibrational or rotational forces below a given threshold level. When clip 300 is mounted on housing 445 and/or strap 200, projection 360 is aligned to mate with a recess 147.

Figure 4:
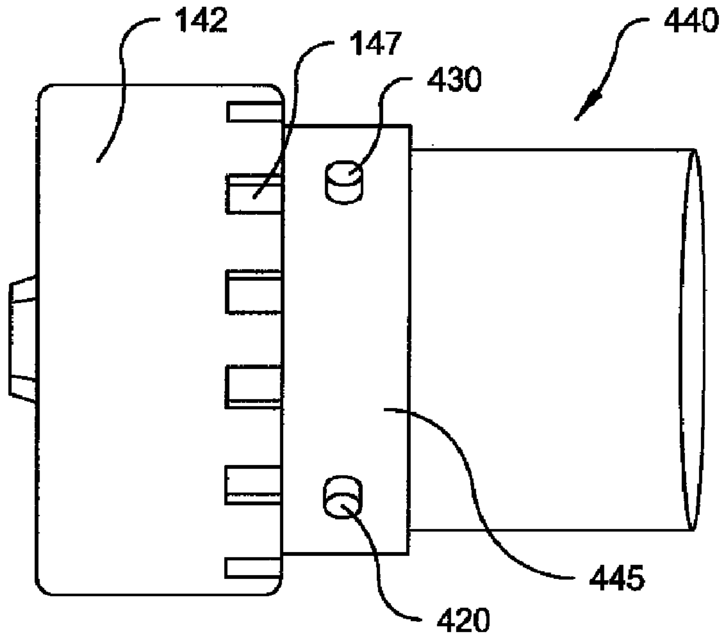
FIG. 4 illustrates an exemplary crown nut according to an embodiment of the invention.

Referring now to FIG. 4, another exemplary embodiment of a male connector 440 includes a crown nut 142, and a housing 445. In an exemplary embodiment, housing 445 has two projections or bosses 420, 430 on its outer surface. Projections 420, 430 extend radially from the outer surface, i.e., generally orthogonally from the outer surface, of housing 445. In an exemplary embodiment, projections or bosses 420, 430 are generally cylindrical and have generally circular cross-section. In other embodiments, projections 420, 430 may have different cross-sections. Projections 420, 430 are adapted to be received by indents 340, 350 (of clip 300 of FIGS. 3A-3B). In an exemplary embodiment, the height and the width of projections 420, 430 are generally equal to the depth and the width of indents 340, 350 (of clip 300 of FIGS. 3A-3B) to establish mechanical coupling between housing 445 and clip 300, sufficiently rigid to resist any relative rotational movement therebetween. In other embodiments, the height of projections 420, 430 is sufficiently big to restrain the relative motion of clip 300 (of FIGS. 3A-3B) with respect to housing 445, once projections 420, 430 are lodged into indents 340, 350 (of clip 300 of FIGS. 3A-3B). Thus, the form and function of projections 420, 430 is similar to those of projections or bosses 220, 230 (of strap 200 of FIGS. 2A-2B).

Figure 5A:
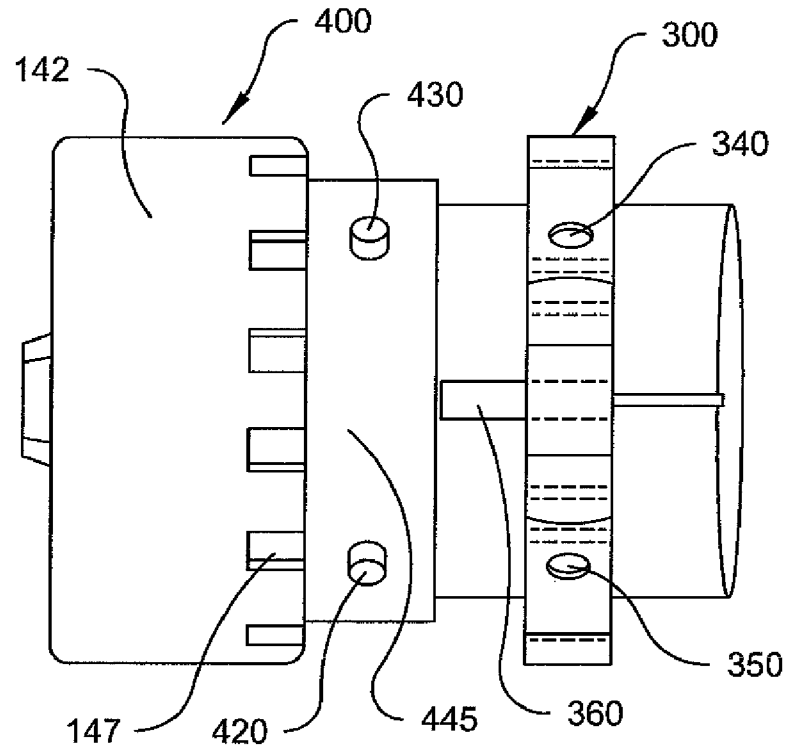
FIGS. 5A-5B show an exemplary method for restraining rotational movement of a crown nut, using the crown nut of FIG. 4 and the spring clip of FIGS. 3A-3B.
Figure 5B:
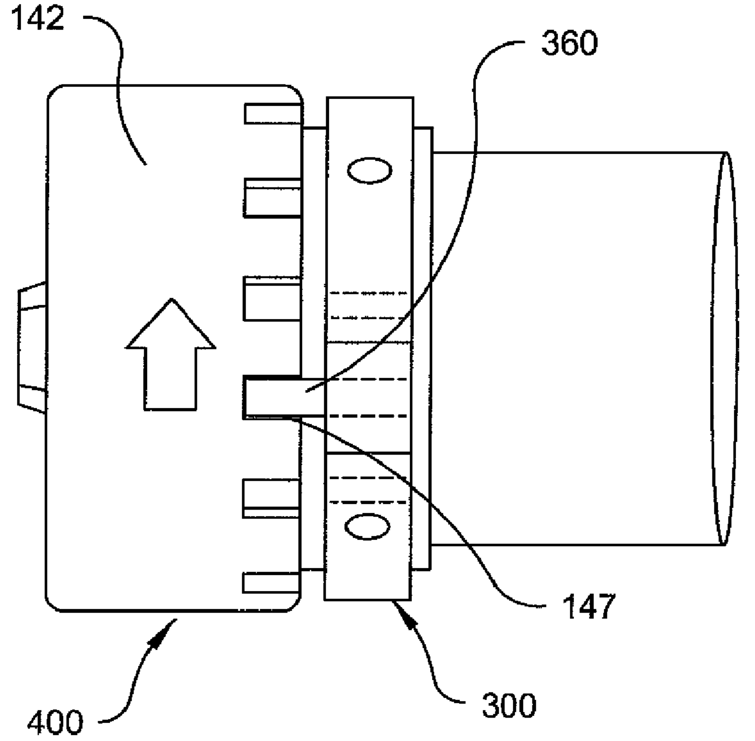

Referring now to FIG. 5A-5B, a method for inhibiting unintended rotation of nut 422 about female connector 130 (of FIG. 1), for example, in a high vibration environment, will be described. The mechanism generally restrains the unintentional rotational motion of crown nut 422, once male connector 440 has been threadingly coupled to female connector 130. Male connector 440 is mechanically and electrically coupled to coaxial cable 120 (of FIG. 1) and female connector 130 (of FIG. 1) is mechanically and electrically coupled to coaxial cable 110 (of FIG. 1), which are not further described for the sake of brevity. In an exemplary embodiment, male connector 440 is then mechanically coupled to female connector 130 (of FIG. 1) by threadedly engaging nut 422 with external threads 136 of connecting ring 135 (of FIG. 1), once an electrical connection between cables 110, 120 has been established. Such a threaded coupling between crown nut 422 and connecting ring 135 is generally sufficient to maintain mechanical and electrical connections between male connector 440 and female connector 130 in absence of external forces on the threaded coupling. However, when such a coupling is subjected to external forces such as vibrational forces, such vibrational forces may lead to a loosening of or even a gradual complete decoupling of the threaded connection between crown nut 422 and connecting ring 135. This in turn may cause an undesired break in the electrical pin/socket connection between the two RF connectors 130, 440.

To inhibit such a loosening of crown nut 422 from connecting ring 135, a clip 300, as shown in FIGS. 3A, 3B, is mounted on housing 445 such that projections or bosses 420, 430 are received in indents 350, 340 respectively. Clip 300 acts as an intermediary between nut 422 and housing 445, and effectively secures nut 422 to housing 445 as set forth below. The couplings of projections 420, 430 and indents 350, 340 operate as restraints on the relative motion of clip 300 with respect to housing 445. A torque or a rotational force, below a given threshold level, exerted on clip 300, in a clockwise or a counter-clockwise direction, will be resisted by the respective couplings of projections 420, 430 and indents 350, 340, thereby inhibiting rotational motion of clip 300 about housing 445. Clip 300 is thus effectively affixed to housing 445. Projection 360 is further caused to mate with a recess 447 in crown nut 422. Without clip 300, the external vibrational or rotational forces may cause crown nut 422 to start to threadedly disengage from, or to loosen from, connecting ring 135 (of FIG. 1). Such unintended rotational movement of nut 422 about connecting ring 135 results in a movement of nut 422 in a direction proximal to housing 445, thereby compromising the integrity of the mechanical and ultimately the electrical couplings between connectors 130, 440. However, when clip 300 is secured about housing 445, if a rotational force causes nut 422 to loosen from external threads 136 (of FIG. 1), (for example, in a high vibration environment), such rotational motion will be restrained by clip 300 as set forth below. Clip 300 is effectively affixed to housing 445 via projections or bosses 420, 430 lodged in indents 350, 340 respectively. Projection 360 lodged in recess 147 effectively affixes clip 360 to crown nut 422. Thus, crown nut 422 is effectively restrained in its motion relative to housing 445. External vibrational or rotational forces, below a given threshold level, acting on nut 422 are then resisted by projection 360 lodged in recess 147. Projection 360 and bosses 420, 430, thus, inhibit the rotational motion crown nut 422 relative to housing 445 as well as to connecting ring 135 (of FIG. 1) and keep intact the mechanical and electrical coupling between female connector 130 (of FIG. 1) and male connector 440.

Figure 6A:
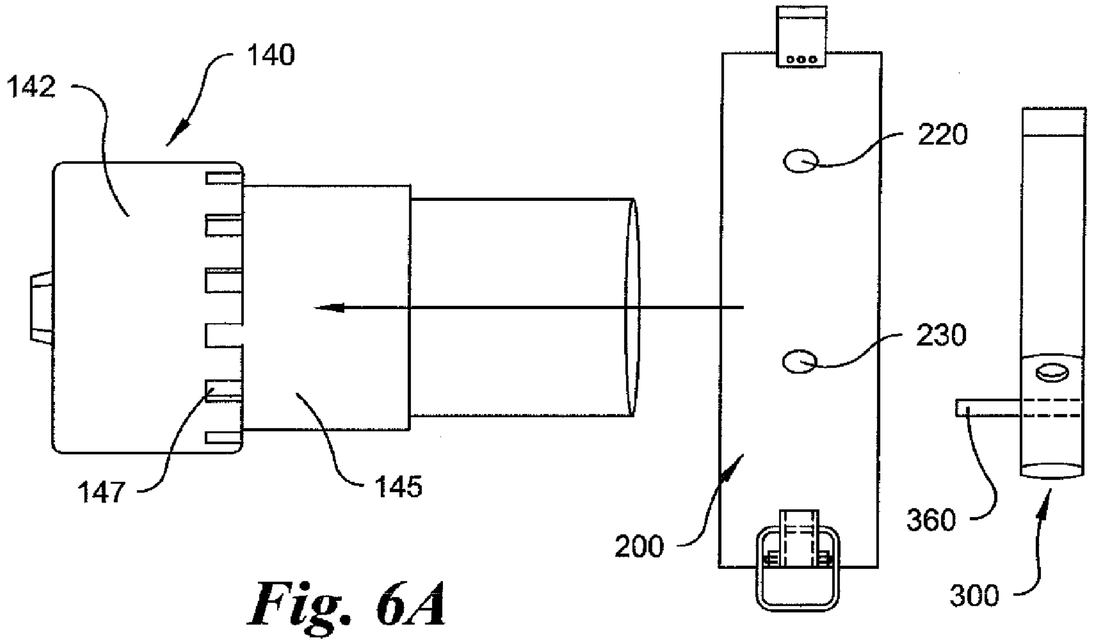
FIGS. 6A-6C illustrate another exemplary method for restraining rotational movement of a crown nut, using the tension strap of FIGS. 2A-2B and the spring clip of FIGS. 3A-3B.
Figure 6B:
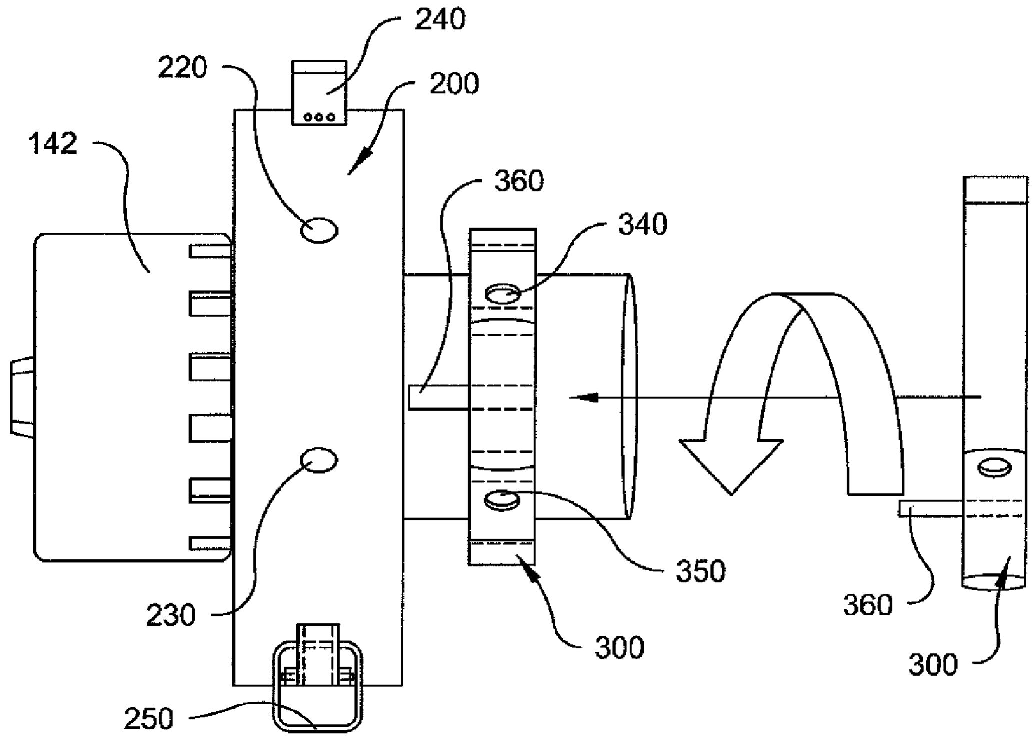
Figure 6C:
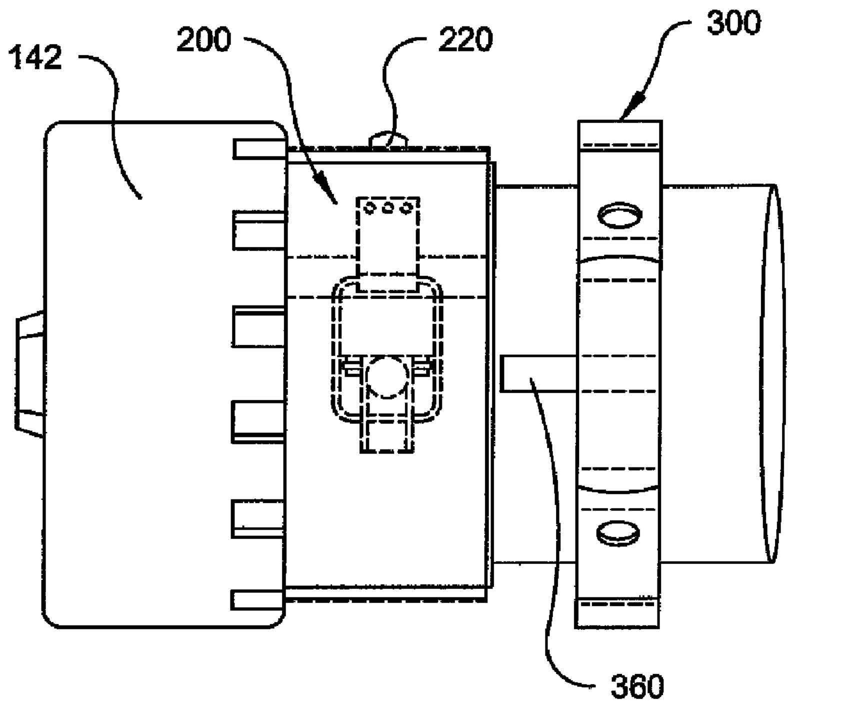

FIG. 6A-6C illustrate another exemplary mechanism for inhibiting nut 422 from loosening from external threads 136 (of FIG. 1). Tension strap 200 is positioned circumferentially about the outer surface of housing 145 of male connector 140 and buckled via hook 240 and buckle 250 so as to surround housing 145. As previously discussed, strap 200 includes projections or bosses 220, 230. Strap 200 is tightly wrapped about portion 445 to generally resist rotational motion about housing 445. Clip 300 is mounted on strap 200 such that indents 340 receive projections or bosses 220, 230 and projection 360 mates with recess 447 and such that it surrounds at least a portion of housing 445. The rotational motion of nut 422 relative to connecting ring 135 (of FIG. 1) and to housing 145 is restrained as described above by projection 360 and recess 447 as well as projections or bosses 220, 230 and indents 340.

Figure 7:
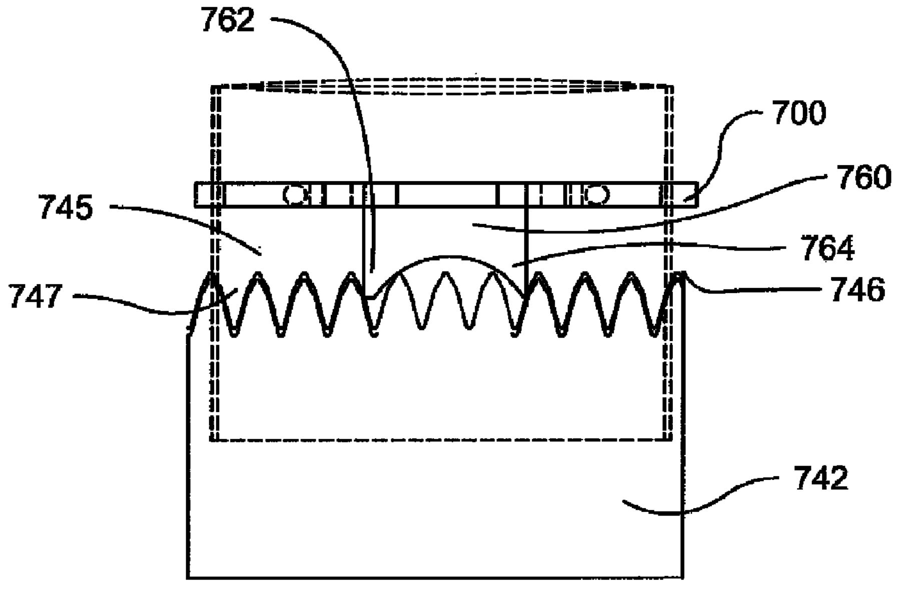
FIG. 7 illustrates an exemplary interface composed of a projection and a recess according to an embodiment of the invention.

FIG. 7 illustrates another exemplary configuration of projection 760 on a clip 700 and recesses 747. Projection 760 has two prongs 762, 764. Recesses 747 are similar in shape to teeth on a gear and are defined on an edge 746 proximal to clip 700. Prongs 762, 764 engage with recesses 747 and restrain rotational motion of crown nut 742 relative to connecting ring 135 (of FIG. 1) and to housing 745.

Another embodiment of the invention includes a kit for restraining rotational motion of a crown nut 142 having at least one recess 147. The kit includes a tension strap 200, and a spring clip 300. Strap 200 is dimensioned to circumscribe housing 145 of a male connector 140 such that there is no significant relative motion between the housing 145 and strap 200.

It will be apparent to those skilled in the art that modifications and variations may be made in the system of the present invention without departing from the spirit or scope of the invention. It is intended that the present invention cover the modification and variations of this invention provided they come within the scope of the appended claims and their equivalents.

What is claimed is:

1. A locking mechanism to inhibit rotational movement of a nut of a first cable connector that is threadingly engaged with a mating second cable connector, the nut having at least one recess in its outer surface along an edge, and being rotatably mounted on a fixed housing of said first cable connector, said mechanism comprising:

a component adapted to removably surround at least a portion of the housing of said first cable connector, said component comprising at least one first element insertably engageable with a corresponding at least one second element positioned on said housing of said first cable connector; and a projection, rigidly mounted on said component, said projection adapted to engage the at least one recess of the nut when said component is engaged with and secured to the outer surface of the housing of said first cable connector, wherein said at least one first element is a bore and said corresponding at least one second element is a boss adapted to be inserted into said bore.

2. The locking mechanism of claim 1, wherein said at least one first element comprises a plurality of bores and wherein said corresponding at least one second element comprises a plurality of bosses configured such that each of said plurality of bosses insertably engages at least one of said plurality of bores.

3. The locking mechanism of claim 1, wherein said projection is orthogonal to said component.

4. The locking mechanism of claim 1, wherein said corresponding at least one second element comprises a second boss and wherein said at least one first element is a bore adapted to receive said second boss.

5. The locking mechanism of claim 1, wherein said corresponding at least one second element comprises a bore and wherein said at least one first element is a second boss adapted to be inserted in said bore positioned on the housing.

6. A locking mechanism to inhibit rotational movement of a nut of a first cable connector that is threadingly engaged with a mating second cable connector, the nut having at least one recess in its outer surface along an edge, and being rotatably mounted on a fixed housing of said first cable connector, said mechanism comprising:

a component adapted to removably surround at least a portion of the housing, said component comprising at least one first element matingly engageable with a corresponding at least one second element positioned on said housing;

a projection, rigidly mounted on said component, said projection adapted to engage the at least one recess of the nut when said component is engaged with and secured to the outer surface of the housing; and a tension strap, wherein said corresponding at least one second element is positioned on said tension strap.

7. The locking mechanism of claim 6, wherein said corresponding at least one second element positioned on said tension strap comprises a second projection and wherein said at least one first element comprises an indent adapted to receive said second projection.

8. The locking mechanism of claim 6, wherein said corresponding at least one second element positioned on said tension strap comprises an indent and wherein said at least one first element comprises a second projection adapted to be received by said indent.

9. A kit for providing a locking mechanism to inhibit rotational movement of a nut of a first cable connector that is threadingly engaged with a mating second cable connector, the nut having at least one recess on its outer surface, and being rotatably mounted on a fixed housing of the first cable connector, said kit comprising:

a tension strap having at least one first element, said tension strap dimensioned to circumscribe the housing of said first cable connector; and a spring clip, said spring clip comprising:

at least one projection projecting longitudinally, said at least one projection adapted to be received by the at least one recess; and at least one second element adapted to matingly engage with said at least one first element.

10. The kit of claim 9, wherein said at least one first element is a projection and said at least one second element is an indent adapted to receive said projection.

11. The kit of claim 9, wherein said at least one first element is an indent and wherein said at least one second element is a projection adapted to be received by said indent.

12. A cable connector configured to be threadingly engaged with a mating second cable connector, comprising:

a fixed housing;

at least one first element positioned on said fixed housing a nut rotatably mounted on said fixed housing and having at least one recess in its outer surface along an edge;

a locking mechanism to inhibit rotational movement of said nut comprising:

a component adapted to removably surround at least a portion of said housing, said component comprising at least one second element insertably engageable with a corresponding at least one of said first element; and a projection, rigidly mounted on said component, said projection adapted to engage the at least one recess of the nut when said component is engaged with and secured to the outer surface of the housing, wherein said at least one first element is a bore and said corresponding at least one second element is a boss adapted to be inserted in said bore.

13. A cable connector configured to be threadingly engaged with a mating second cable connector, comprising:

a fixed housing;

at least one first element positioned on said fixed housing;

a nut rotatably mounted on said fixed housing and having at least one recess in its outer surface along an edge;

a locking mechanism to inhibit rotational movement of said nut comprising:

a component adapted to removably surround at least a portion of said housing, said component comprising at least one second element matingly engageable with a corresponding at least one of said first element; and a projection, rigidly mounted on said component, said projection adapted to engage the at least one recess of the nut when said component is engaged with and secured to the outer surface of the housing;

wherein said at least one first element is a projection and said corresponding at least one second element is an indent adapted to receive said projection.

14. The cable connector of claim 13, wherein said at least one first element further comprises at least a second projection and wherein said corresponding at least one second element further comprises at least a second indent configured such that each of said plurality of indents matingly engages at least one of said plurality of projections.

15. The cable connector of claim 12, wherein said at least one first element comprises a plurality of bores and wherein said corresponding at least one second element comprises a plurality of bosses configured such that each of said plurality of bosses insertably engages at least one of said plurality of bosses.

16. The cable connector of claim 12, wherein said projection is orthogonal to said component.

17. A locking mechanism to inhibit rotational movement of a nut of a first cable connector that is threadingly engaged with a mating second cable connector, the nut having at least one recess in its outer surface along an edge, and being rotatably mounted on a fixed housing of said first cable connector, said mechanism comprising:

a component adapted to removably surround at least a portion of the housing of said first cable connector, said component comprising at least one first element insertably engageable with a corresponding at least one second element positioned on said housing of said first cable connector; and a projection, rigidly mounted on said component, said projection adapted to engage the at least one recess of the nut when said component is engaged with and secured to the outer surface of the housing of said first cable connector, wherein one of said at least one first element and said at least one second element is a bore, and the other of said at least one first element and said at least one second element is a rigid boss configured to be inserted into said bore.

* * * * *